United States Patent

[11] 3,591,782

| | | | | |
|---|---|---|---|---|
| [72] | Inventor | Geert H. Bouman<br>Yorktown Heights, N.Y. | [50] | Field of Search.......... 318/603;<br>235/92; 235/151.11; 340/347, 44, 53 |
| [21] | Appl. No. | 880,754 | | |
| [22] | Filed | Oct. 31, 1969 | [56] | References Cited |
| [45] | Patented | July 6, 1971 | | UNITED STATES PATENTS |
| [73] | Assignee | International Business Machines<br>Corporation<br>Armonk, N.Y.<br>Continuation-in-part of application Ser. No.<br>791,414, Jan. 15, 1969, now abandoned. | 3,258,667  6/1966  McDonough et al. ........ 318/603<br>3,490,017  1/1970  Kolell et al.................... 340/347 |  |

*Primary Examiner*—Eugene G. Botz
*Attorneys*—Hanifin and Jancin and Edward S. Gershuny

[54] DIGITAL TO PHASE ANALOG CONVERTER
10 Claims, 6 Drawing Figs.

[52] U.S. Cl. .................................................. 235/151.11,
318/603, 340/347
[51] Int. Cl. ........................................................ G05b 19/18,
H03k 13/04

ABSTRACT: A digital to phase analog converter which accepts input digital data from a linear interpolator and produces a reference square wave signal for each machine tool and a command-position signal for each machine tool axis that is being controlled. Each command-position signal has a phase displacement from the reference signal that is related to the input digital data. The command-position signal is generated by adding the contents of a running counter to the contents of a phase control register. The high-order trigger of the adder produces the command-position signal.

FIG. 1
_PRIOR ART_
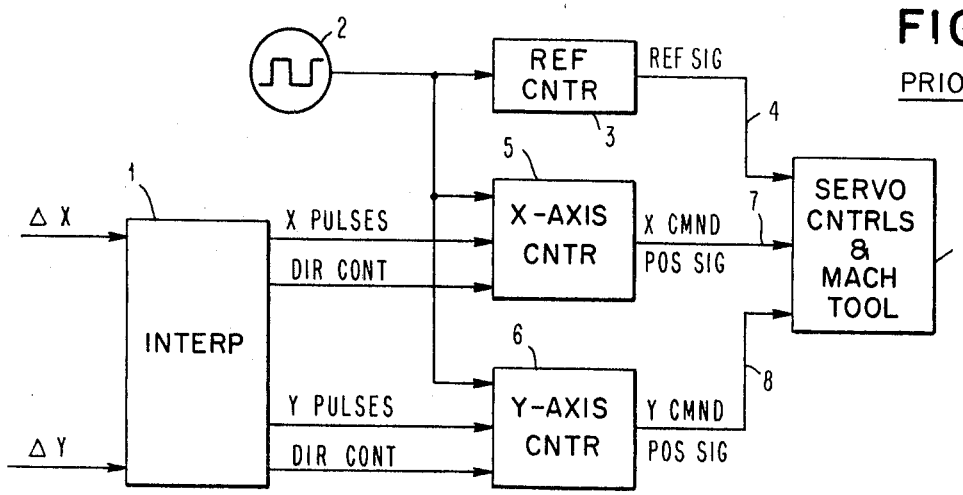
FIG. 2
FIG. 3
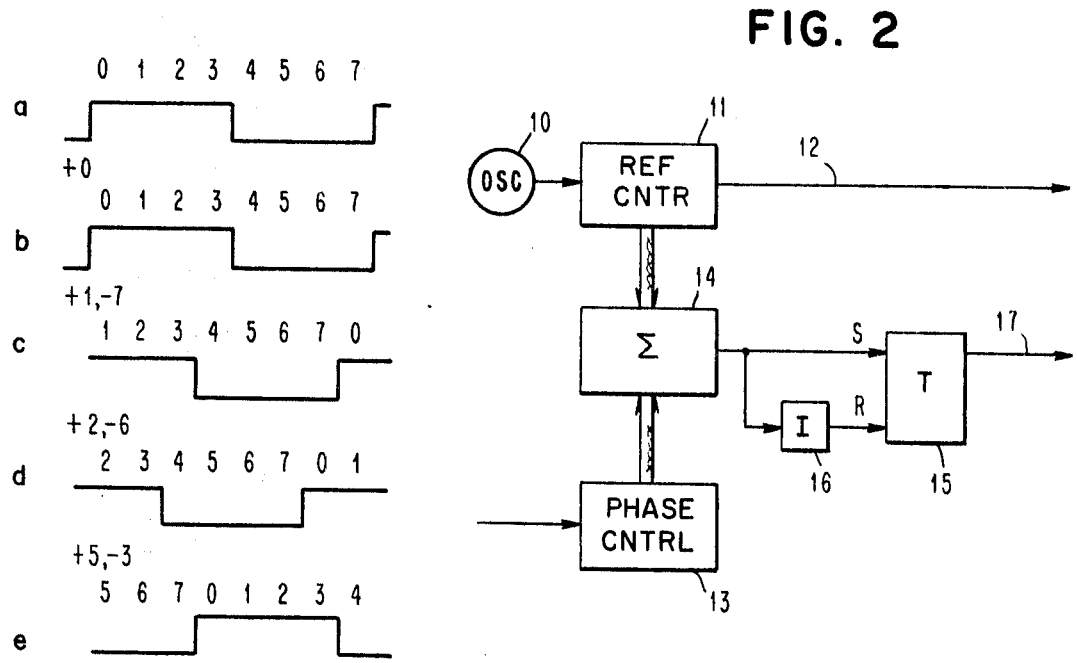
INVENTOR
GEERT H. BOUMAN
BY Edward S. Gershuny
ATTORNEY

DIGITAL TO PHASE ANALOG CONVERTER

INTRODUCTION

This is a continuation-in-part of application Ser. No. 791,414 filed Jan. 15, 1969 and now abandoned.

This invention relates to apparatus for producing a phase analog signal from input digital data. More particularly, it relates to apparatus for producing from input digital data a signal which has a varying phase displacement from a reference signal for controlling the motion of one or more axes of one or more numerically controlled machine tools.

PRIOR ART

It is well known to supply position information the controls for each axis of a machine tool in the form of two square waves. One of the square waves is a reference signal having a predetermined frequency, and the other square wave is a command-position signal which has a changing phase displacement relative to the reference signal. The changes in this phase displacement are related to the relative motion desired between the workpiece and the cutting head of the machine tool, or more generally, between two elements of a machine.

The reference signal establishes basic timing for all axes of the machine tool. It is typically obtained by monitoring the high-order trigger of a reference counter which is fed by a free-running reference oscillator. The reference signal will have a frequency that is equal to the frequency of the reference oscillator divided by the number of count conditions of the reference counter. For each axis of the machine tool there is an axis position counter which also receives an input from the reference oscillator. Additional inputs to each axis position counter are commonly supplied by a linear interpolator. These additional inputs comprises pulse streams containing distance information and pulses containing direction information. Depending upon the direction of motion that is desired, the distance information pulses will either be added to or subtracted from the axis position counter. The command position signal is obtained by monitoring the high-order trigger of the axis position counter.

One disadvantage of the prior art described above is that there must be one axis position counter for each machine tool axis. No part of any of the axis position counters is shared by any other axis position counter. Also, because a typical reference oscillator will have a frequency on the order of 250,000 cycles per second, each axis position counter must be able to perform additions and subtractions at an effective rate in excess of 250,000 operations per second so that it can sum the reference pulses as well as the incoming distance pulses.

BRIEF SUMMARY OF THE INVENTION

The above and other disadvantages of the prior art are overcome in accordance with one aspect of this invention by providing apparatus containing certain elements which are shared among a plurality of machine tool axes. The reference signal is, as in the prior art, generated by monitoring the high-order trigger of a reference counter which is fed by a free-running reference oscillator. Associated with each machine tool axis is a phase control register which counts (by adding or subtracting, as appropriate) pulses received from an interpolator or which receives a predetermined count from an input device. A parallel adder receives one input from the reference counter. The other input to the adder is supplied in successive time periods by each one of the phase control registers. The high-order trigger of the adder is successively gated to appropriate ones of a plurality of binary triggers, there being one trigger for each machine tool axis. The output of each of the binary triggers will be a command-position signal.

In accordance with another aspect of the invention, additional simplification of the circuitry is attained by sampling each phase control register at a rate which is slower than the counting rate of the reference counter. Errors which might be introduced into the system by this relatively low sampling rate may be minimized by randomizing the sequence in which the various phase control registers are sampled.

One advantages of this invention is that a significant portion thereof (the adder) is shared by apparatus related to a plurality of machine tool axes. Since the adder will generally be the most costly and complex part of the apparatus, sharing it among a plurality of axes will reduce the total cost and complexity of the digital to phase analog converter.

Another advantage of the invention is that the phase control registers will receive input pulses at a much lower frequency than the axis counters used in the prior art. For this reason, low speed circuits which are less expensive may be used for the phase control registers.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIG. 1 is a general block diagram of a prior art numerically controlled machine tool system;

FIG. 2 is a block diagram of a digital to phase analog converter implemented in accordance with this invention for a single axis of a machine tool;

FIG. 3 shows a reference signal along with command-position signals of varying phase displacements;

DETAILED DESCRIPTION

Figures 4, 5:
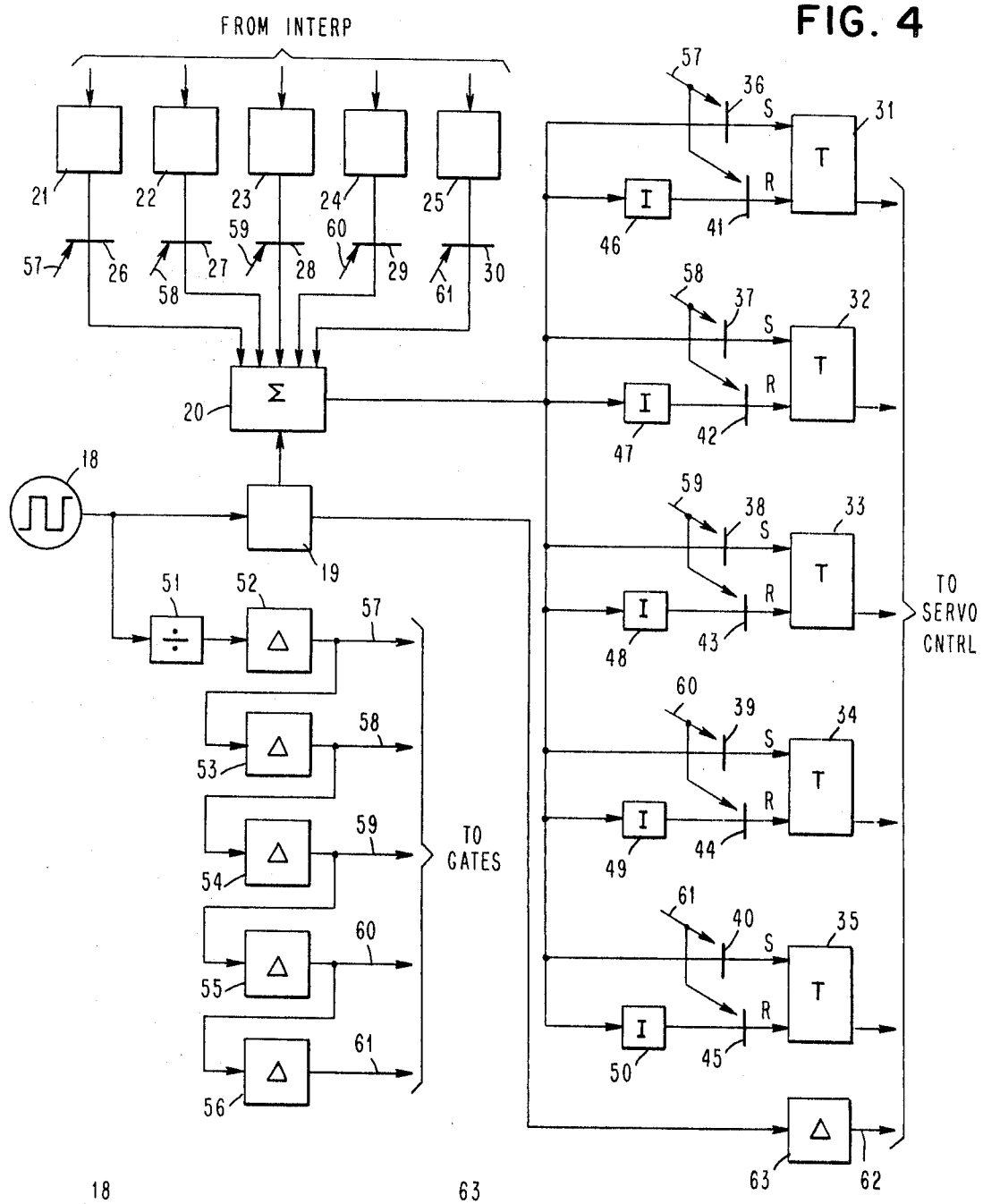
FIG. 4 shows a preferred embodiment of this invention as implemented for providing command-position signals for five machine tool axes.
FIG. 5 shows an alternative embodiment of apparatus for transmitting timing phases to various gates contained within the system shown in FIG. 4.

FIG. 1 shows a block diagram of various elements of a prior art numerically controlled machine tool system. An interpolator 1 accepts numerical data representing distances that each axis is to move for a given straight line cut. From this data, the interpolator generates, for each axis of motion, a stream of pulses in which each pulse indicates one increment of movement. For each axis, the interpolator also generates a signal which indicates the direction of movement. A reference oscillator 2 supplies signals to a reference counter 3, the high-order trigger of which produces a reference square wave signal on line 4. The output of reference oscillator 2 is also fed to X-axis counter 5 and Y-axis counter 6. (In a machine having more than two axes, there would also be a counter for each additional axis.) X-axis counter 5 receives X pulses and direction control signals from the interpolators, and Y-axis counter 6 receives Y pulses and direction control signal from the interpolator. The pulses received from the interpolator are added to or subtracted from the respective counters in accordance with the appropriate direction control signals. The high-order trigger of the X-axis counter is used to generate an X command-position square wave signal on line 7, and the high-order trigger of the Y-axis counter is used to generate a Y command-position square wave signal one line 8. The reference signal on line 4 and the command-position signals on line 7 and 8 are fed to the servocontrols and machine tools 9. Within the controls and tool 9, the varying phase difference between a command-position signal and the reference signal furnishes control information to drive a movable bed. Contained within the controls and tool 9 are phase discriminators resolvers (position sensors), amplifiers, wave shapers and means for moving the workpiece or the cutting head. All of these are well known in the art and need not be described herein. For additional details of the controls and tool 9, reference may be made, for example, to copending application Ser. No. 787,643 filed Dec. 31, 1968 by J. G. Brenza for MACHINE TOOL CONTROL SYSTEM, the disclosure of said application being incorporated herein by this reference.

This invention is primarily concerned with the apparatus that is shown between the interpolator 1 and the controls and tool 9 of FIG. 1. A simplified form of the apparatus of this invention is shown in FIG. 2. It comprises a free-running oscillator 10 which feeds a reference counter 11 the high-order trigger of which is monitored to produce a reference signal on line 12; a phase control register 13 which receives its inputs from an interpolator and counts up or down in accordance with the direction control information supplied to it; a parallel adder 14 which receives its inputs from the reference counter 11 and the phase control register 13, the high-order trigger of the adder being monitored to produce a command-position signal. A trigger or other suitable two-state device 15 acts as a buffer for the command-position signal. In order to set trigger 15 to an appropriate state, the high-order trigger of the adder 14 is fed to the "set" input of trigger 15, and the high-order trigger of adder 14 is fed to an inverter 16 which feeds the "reset" input of trigger 15. The "1" output 17 of trigger 15 will carry the command-position signal. It should be noted that the phase control register 13, instead of counting discrete pulses supplied to it, could receive from the source of input data a number which is equal to the count in the phase control register at which a change of state of the command-position signal would be desired. Although, in the following description, the phase control registers will be described as being counters, those skilled in the art will recognize that this term includes the situation where a number is placed in the phase control register. The number would, of course, generally be changed after each change in state of the command-position signal.

The operation of the apparatus shown in FIG. 2 may be explained by referring to the signal diagrams shown in FIG. 3. In the illustrations of FIG. 3, it is assumed that the reference counter 11, the phase control register 13 and the adder 14 are three-position binary devices. The output (reference or command position) signal generated by the high-order trigger of reference counter 11 or adder 14 is arbitrarily defined as being "up" if the device is in any of the state 0 through 3 and "down" if the device is in any of the states 4 through 7. Signal "a" shows the reference signals produced on line 12 of FIG. 2. During time periods 0 through 3 it is up, and during time periods 4 through 7 it is down. Signals "b," "c," "d" and "e" are command-position signals produced on line 17. They have a phase difference from the reference signal "a" depending upon the contents of phase control register 13. As shown by signal "b," if phase control register 13 contains a 0, the command-position signal will be exactly in phase with the reference signal. As shown by signal "c," if phase control register 13 has been counted up to 1 (or down to —7) the command-position signal derived from the high-order trigger of adder 14 after adding the contents of reference counter 11 to the contents of phase control register 13 will lead the reference signal by one time period (or lag behind the reference signal by seven time periods). Signals "d" and "e" respectively show the command-position signals which would result if phase control register 13 had been counted up to 2 (or down to —6) and up to 5 (or down to —3). In the case of signal "d," the command-position signal leads the reference signal by two units (or lags by six units), and as shown by signal "e," the command-position signal leads the reference signal by five units (or lags by three time units). As shown in FIG. 3, the command-position signals produced by the apparatus of FIG. 2 will have a phase displacement from the reference signal that is identical to those produced by the prior art apparatus shown in FIG. 1.

The simplified embodiment of FIG. 2 produces only a single command-position signal. In this case, the command-position signal buffer (comprising trigger 15 and inverter 16) is not necessary. However, as will be described in more detail below, in preferred embodiments of this invention the adder 14 will be time-shared among a plurality of phase control registers and a buffer for each command-position signal will generally be required.

FIG. 4 shows a preferred embodiment of the invention in a configuration which produces a command-position phase analog signals for each of five machine tool axes. The axes may pertain to one or more machine tools. For example, the output signals from the apparatus of FIG. 4 could feed two different machine tools, one being a three-axis tool and the other being a two-axis tool.

For producing a reference signal, there is provided a free-running oscillator 18 which feeds a reference counter 19 the high-order trigger of which may be monitored to produce the reference signal. A parallel adder 20 is fed by the reference counter 19. For keeping count of distance-indicating pulses for each machine tool axis, five phase control registers 21—25 are provided, there being one phase control register for each axis to be controlled. The contents of each of the phase control registers may be gated to the parallel adder 20 through one of the gates 26—30. Each of the phase control registers 21—25 receives distance and direction pulse from an interpolator. All of the phase control registers may be fed by a single interpolator, or the registers may be grouped (generally one group for each machine tool) and each group may be fed information by an interpolator. Also, of course, the phase control registers, instead of counting pulses, could be supplied with pregenerated numbers by an appropriate data source. To provide a buffer for each command-position signal, five two-state devices 31—35 are provided. The "set" input of each of the devices 31—35 is fed through a gate 36—40 by the high-order trigger of parallel adder 20. The "rest" input of each of the two-state devices 31—35 is fed through a gate 41—45 by the output of an inverter 46—50 the input of each of which is connected to the high-order trigger of adder 20. In order to provide gating signals throughout the systems of FIG. 4, the free-running oscillator 18 is connected to a device 51 which will produce a brief timing pulse each time that it receives an input. (The devices 51 may also include a frequency divider as will be explained below.) The timing pulses produced by the device 51 are fed to a series of delay elements 52—56 each except the last of which also feeds the next successive delay element. If the various gates of the system are to be operated once during each reference cycle, then the sum of all the delays introduced by elements 52—56 should be less than one reference period (commonly 4 microseconds). The timing signal produced on line 57 will have been delayed one unit of time, and the timing signals produced on lines 58—61 will have been delayed two, three, four and five units of time respectively. The reason that it is preferred that all of the timing signals be delayed is that this will allow the various registers which feed adder 20 to be sampled after they have been incremented (or decremented) by an input pulses.

Assuming that all sampling operations are to take place once during each reference period, the apparatus of FIG. 4 will operate as follows. Pulses received from an interpolator (or interpolators) will be incrementing (or decrementing) each of the phase control registers 21—25. Pulses from free-running oscillator 18 will constantly be incrementing the contents of reference counter 19. The high-order trigger of reference counter 19 will be monitored to produce a reference signal on line 62. (When sampling once each period, the delay element 63 need not be included in the system.) The contents of reference counter 19 form one input to the parallel adder 20. Once during each reference cycle, a short sampling pulse will be generated at the output of device 51. This sampling pulse will, after a short delay introduced by element 52, be sent on line 57 to gates 26, 36 and 41. The timing pulse will enable gates 26, 36 and 41 to permit the contents of phase control register 21 to be gated into the second input of parallel adder 20. If the sum of the contents of registers 19 and 21 is such that the high-order trigger of adder 20 is a 1, trigger 31 will be set; if the sum of the contents of registers 19 and 21 results in the high-oder trigger of adder 20 being set to a 0, trigger 31 will be reset. The output of trigger 31 will comprise the commandeposition signal for one machine tool axis. Since each of the delays introduced by elements 52—56 is preferably slightly longer than the duration of a timing signal, gates 26, 36 and 41 will have been disabled before a second timing signal appears on line 58. The timing signal on line 58, which has been delayed by two units of time, will enable gates 27, 37 and 42 to permit the contents of phase control register 22 to be gated to the second input of parallel adder 20. Trigger 32 will then be set or reset in accordance with the state of the high-order trigger of adder 20. In subsequent portions of the reference cycle, timing signals will appear on lines 59, 60 and 61 to successively enable their respective sets of gates (28, 38, 43), (29, 39, 44) and (30, 40, 45) to set or reset their respective triggers 33, 34, 35. As will be clear to those skilled in the art, it might be desirable to introduce additional delays (not shown) to the timing signals which feed in gates at the inputs of each of the triggers 31—35 to ensure that a proper sum will have been generated within the parallel adder 20 before the state of the high-order trigger thereof is gated to the set and reset inputs of the triggers. The output of each of the triggers 31—35 will be fed to the servocontrols for its associated machine tool axis.

In commonly used machine tool systems, the frequency of the pulses produced by the reference oscillators 18 is often on the order of 250,000 cycles per second and the frequency of the reference signal and the command-position signals is generally on the order of 250 cycles per second. Because the reference signal and the command-position signals are changing quite slowly as compared to the signal produced by the reference oscillator, when using this invention it will generally be advantageous to sample the contents of the various phase control registers at a rate that is somewhat lower than the reference oscillator frequency. This may conveniently be done by including within the device 51 a frequency divider which will produce an output pulse after it has received a given number of input pulses. In this case, the total time delay introduced by elements 52—56 could be larger than one period of the reference oscillator 18. One advantages of this approach is that, for all of the devices shown in FIG. 4 except the reference oscillator 18 and the reference counter 19, relatively low speed, inexpensive circuitry could be utilized. One possible disadvantage of this approach is that the phase displacement between a given command-position signal and the reference signal might not be exactly that which is desired. For example, if each of the gates in the system were to be enabled once for each 10 reference cycles (that is, the frequency divider within device 51 divides by 10), the time at which a given command-position signal changes its state could be delayed by an amount of time equal to up to nine periods of the reference oscillator 18. On the average, the delay for a given change of state of a given command-position signal would in this case be equal to 4.5 reference periods (18 microseconds if the reference oscillator has a frequency of 250,000 cycles per second). However, the error would not be completely random, but would be dependent on the actual contents of registers 21—25. The reference signal can be delayed by a delay element 63 an amount of time equal to the average delay of the command-position signal. For the case of the example given above, delay element 63 should introduce a delay of 18 microseconds.

As will also be clear to those skilled in the art, another manner of obtaining relatively lower-frequency timing pulses would be to generate timing pulses from the output of one of the triggers of the reference counter 19. For example, if it were desired to enable the various given shown in FIG. 4 after each 30-second reference oscillator pulse, timing pulses could be derived from the "0" (or the "1") output of the fifth lowest-order trigger of counter 19 assuming that counter 19 is a binary counter. This would eliminate the necessity for including a frequency divider within unit 51.

FIG. 5 shows an alternative embodiment of apparatus for generating the timing pulses for the various gates of the system shown in FIG. 4. The delay elements 52—56 shown in FIG. 4, may be replaced by a counter 64 which has a number of count conditions that is at least equal to the number of command-position signals that are to be generated. If the counter 64 can assume any one of $n$ states, and the frequency divider contained within device 51 produces one output signal for each $m$ input signals, then if it is desired to compensate for the average shift of the generated command-position signals, the delay element 63 would need to introduce a time delay that is approximately equal to $mn/2$ periods of the reference oscillator 18. Output lines 57—61 of the counter 64 will carry enabling signals to the various gates of the system shown in FIG. 4.

Another manner in which the small effects of delays introduced by a relatively slow sampling rate can be minimized is to vary the phase of the sampling scan. Some ways of accomplishing this are to drop a reference oscillator pulse after each complete sampling cycle, or randomize the initial condition of counter 64 at the beginning of each scanning sequence. The rapid perturbations around the precise average reference command value as specified in registers 21—25 will generally not be reflected in the machine motions because of the limited servo bandwidths.

In some situations it may be desirable to sample certain phase control registers at a more rapid rate than the other phase control registers. In the system shown in FIG. 4, assume that it is desirable to sample phase control registers 21, 22 and 24 at twice the rate at which registers 23 and 25 are sampled. This may be accomplished through the use of apparatus such as is shown in FIG. 6.

Figure 6:
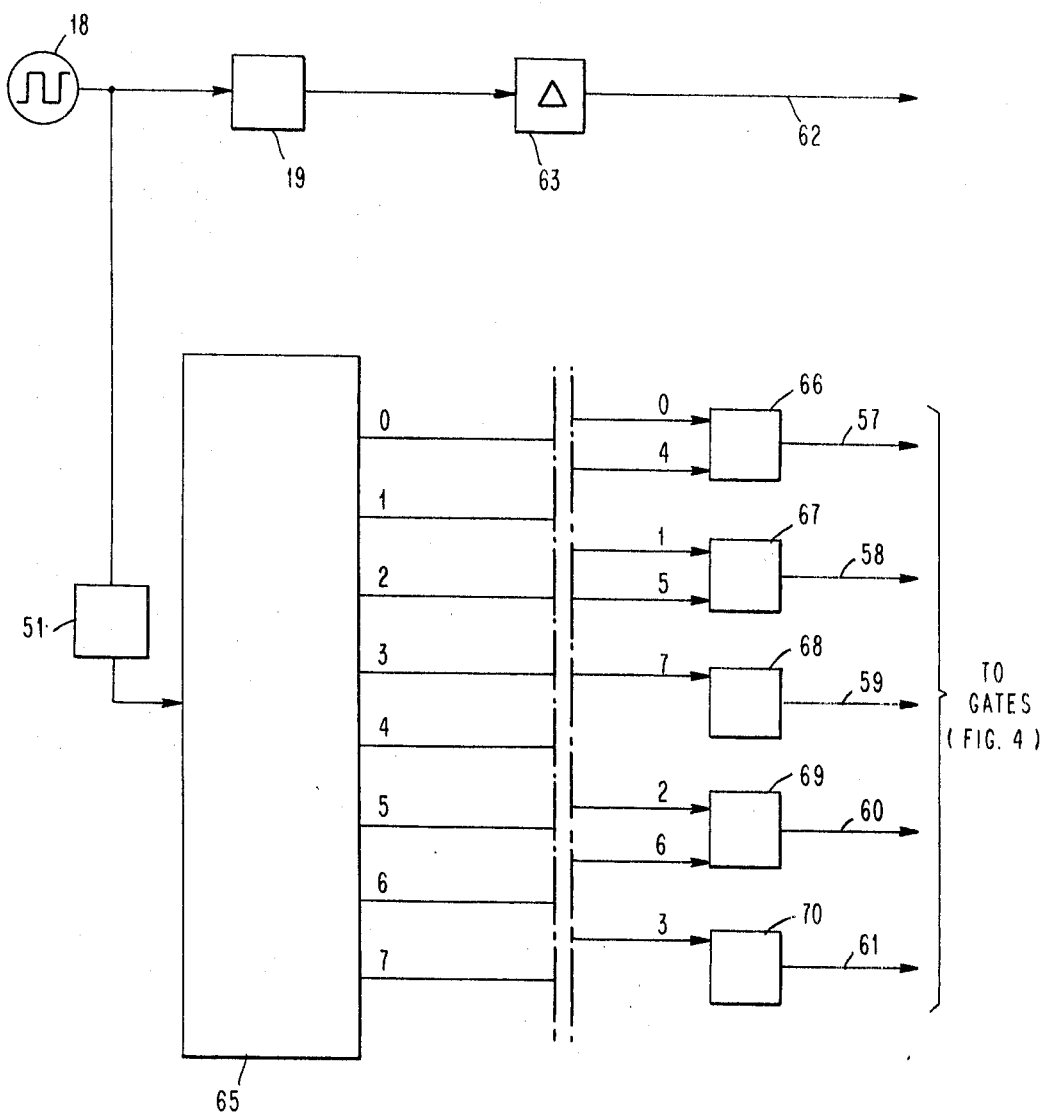
FIG. 6 shows apparatus for varying the scan which samples the phase control registers.

FIG. 6 shows a multistate device (such as a counter) 65 which feeds several OR circuits 66—70 each of which is associated with one of the gate control lines 57—61. When the counter is in state "zero" or state "four," a gating pulse will be produced on line 57; when the counter is in state "one" or state "five," a gating pulse will be produced on line 58; when in state "seven," a gating pulse will be produced on line 59; when in state "two" or "six," a gating pulse will be produced on line 60; and when the counter is in state "three," a gating pulse will be produced on line 61. Thus, phase control registers 21, 22 and 24 will be sampled at twice the rate of registers 23 and 25. In the relatively simple embodiment shown in FIG. 6, OR circuits 68 and 70 each have only one input and aren't really needed. However, they are shown to illustrate the general case in which each OR circuit could have two or more inputs.

It will be recognized by those skilled in the art that any desired mix of sampling rates could be achieved by apparatus such as that shown in FIG. 6. All that one need do is select a multistate device 65 which has the proper number of discrete states and distribute the outputs of the device to the appropriate gating lines. Also, as has been described above, the device 51 may include a frequency divider if desired.

Since the contents of the various phase control registers used in this invention need be sampled at relatively infrequent intervals, it is practical to use this invention for generating command-position signals for each axis of several machine tools. Since the most complex and costly part of the system, the adder, is shared by the apparatus relating to each individual command-position signal, and the phase control registers may be embodied as words in a more economic multiword storage device, the advantages of this invention over the prior art will increase as the number of command-position signals which it generates is increased. When this invention is used to generate command-position signals for the axes of a plurality of machine tools, the reference signal will generally be transmitted to each machine tool along with the command-position signals associated with that tool.

While the invention has been particularly shown and described with reference to preferred embodiments thereof, it will be understood by those skilled in the art that various changes in form and details may be made therein without departing from the spirit and scope of the invention.

What I claim is:

1. A numerically controlled positioning system comprising; a source of motion pulses representing desired travel of a machine tool axis, signal generating means operatively connected to said source for generating a periodic reference signal and a position signal that is displaced in phase from said reference signal, and motion control means operatively connected to said signal generating means for controlling the motion of said machine tool axis; said signal generating means comprising:
   a source of periodic reference pulses;
   reference counting means connected to said source of reference pulses for counting said reference pulses;
   phase control means connected to said source of motion pulses for manifesting a count related to said motion pulses; and
   adding means having its inputs operatively connected to said reference counting means and to said phase control means, and an output operatively connected to said motion control means;
   said adding means manifesting at its output said position signal.

2. A numerically controlled machine tool system comprising; a source of motion pulses representing desired travel of each of a plurality of machine tool axes, signal generating means operatively connected to said source for generating a periodic reference signal and generating for each machine tool axis a position signal that is displaced in phase from said reference signal, and motion control means operatively connected to said signal generating means for controlling the motion of said machine tool axis; said signal generating means comprising:
   a source of periodic reference pulses;
   reference counting means connected to said source of reference pulses for counting said reference pulses;
   a plurality of phase control means, each associated with one of said machine tool axes, each connected to said source of motion pulses for manifesting a count related to the motion pulses pertaining to its associated machine tool axis;
   adding means having a first input operatively connected to said reference counting means;
   first gating means selectively connecting each of said plurality of phase control means to a second input of said adding means;
   a plurality of signal buffering means each having an output operatively connected to the motion controls of a machine tool axis;
   second gating means selectively connecting an output from said adding means to each of said signal buffering means; and
   gate activating means connected to said first and second gating means for causing one of said phase control means to be connected to said adding means and for causing said adding means to be connected to one of said signal buffering means;
   said one of said signal buffering means being caused thereby to store the instantaneous value of the position signal associated with one of said machine tool axes.

3. The signal generating means of claim 2 wherein said gate activating means comprises:
   means for causing the connections between said adding means and a selected one of said phase control means and a selected one of said signal buffering means to be made at a rate which differs from the rate at which connections are made between said adding means and another of said phase control means and signal buffering means.

4. The signal generating means of claim 2 wherein said gate activating means comprises:
   means connected between said source of periodic reference pulses and said first and second gating means for converting said reference pulses into gating pulses and for transmitting said gating pulses in a predetermined manner to said first and second gating means.

5. The signal generating means of claim 3 wherein said gate activating means further comprises:
   frequency dividing means for causing the generation of a gating pulse after a predetermined number of said periodic reference pulses have occurred.

6. The signal generating means of claim 5 wherein said gate activating means further comprises:
   means for causing the connections between said adding means and a selected one of said phase control means and a selected one of said signal buffering means to be made at a rate which differs from the rate at which connections are made between said adding means and another of said phase control means and signal buffering means.

7. A numerically controlled machine tool system comprising; a source of motion pulses representing desired travel of each of a plurality of machine tool axes, signal generating means operatively connected to said source for generating a periodic reference signal and generating for each machine tool axis a position signal that is displaced in phase from said reference signal, and motion control means operatively connected to said signal generating means for controlling the motion of said machine tool axes; said signal generating means comprising:
   a source of periodic reference pulses;
   reference counting means connected to said source of reference pulses for counting said reference pulses;
   a plurality of phase counting means, each associated with one of said machine tool axes, connected to said source of motion pulses for counting the motion pulses pertaining to its associated machine tool axis;
   adding means having first and second inputs and an output, said first input operatively connected to said reference counting means;
   first gating means selectively connecting each of said plurality of phase counting means to said second input of said adding means;
   a plurality of signal buffering means each having an output operatively connected to the motion controls of a machine tool axis;
   second gating means selectively connecting said output from said adding means to each of said signal buffering means; and
   gate activating means connected between said source of periodic reference pulses and said first and second gating means for generating gating pulses for causing successive ones of said phase counting means to be connected to said adding means and for causing said adding means to be connected to successive ones of said signal buffering means;
   each of said signal buffering means being caused thereby to store an instantaneous value of the position signal associated with one of said machine tool axes.

8. The signal generating means of claim 7 wherein said gate activating means further comprises:
   means for causing the connections between said adding means and a selected one of said phase control means and a selected one of said signal buffering means to be made at a rate which differs from the rate at which connections are made between said adding means and another of said phase control means and signal buffering means.

9. The signal generating means of claim 7 wherein said gate activating means further comprises:
   frequency dividing means for causing the generation of a gating pulse after a predetermined number of said periodic reference pulses have occurred.

10. The signal generating means of claim 9 wherein said gate activating means further comprises:
    means for causing the connections between said adding means and a selected one of said phase control means and a selected one of said signal buffering means to be made at a rate which differs from the rate at which connections are made between said adding means and another of said phase control means and signal buffering means.